United States Patent [19]
Kitano et al.

[11] 3,957,145
[45] May 18, 1976

[54] CLUTCH CONTROLLING APPARATUS

[75] Inventors: Shin Kitano, Aichi; Yutaka Momose, Toyota, both of Japan

[73] Assignee: Aisin Seiki Co., Ltd., Japan

[22] Filed: Feb. 23, 1973

[21] Appl. No.: 335,144

[30] Foreign Application Priority Data
Mar. 8, 1972 Japan............... 47-23781

[52] U.S. Cl............... 192/13 R; 192/4 A; 192/4 C; 192/12 C
[51] Int. Cl............. F16d 67/04
[58] Field of Search............ 192/13 R, 4 R, 4 C, 192/12 C, 4 A, 83, 109 F

[56] References Cited
UNITED STATES PATENTS

| | | | |
|---|---|---|---|
| 2,917,143 | 12/1959 | Jenny | 192/13 R |
| 3,240,371 | 3/1966 | Conrad | 192/13 R |
| 3,631,948 | 1/1972 | Ishikawa | 192/4 C |
| 3,696,897 | 10/1972 | Kitano et al. | 192/4 C |
| 3,757,915 | 9/1973 | Mamose | 192/4 A X |

FOREIGN PATENTS OR APPLICATIONS

| | | | |
|---|---|---|---|
| 1,952,000 | 5/1970 | Germany | 192/4 C |
| 1,281,259 | 2/1960 | France | 192/13 R |

*Primary Examiner*—Samuel Scott
*Assistant Examiner*—Lance W. Chandler
*Attorney, Agent, or Firm*—Oblon, Fisher, Spivak, McClelland & Maier

[57] ABSTRACT

Clutch controlling apparatus which may be utilized in industrial-type vehicles, such as for example, forklift trucks, for controlling the vehicle during inching operations includes a source of fluid pressure, a fluid pressure-type clutch fluidically connected to the pressure source, an inching valve disposed within the fluid circuit connecting the fluid pressure source and the clutch mechanism which controls the degree to which the clutch mechanism is actuated and which in turn is actuated to a degree which is dependent upon the depression of the vehicle brake pedal, and limiting means for selectively inactivating the inching valve such that the inching valve is inoperative independent of the brake pedal.

In this manner, when the vehicle is being operated on level ground, the inching operation is performed by intermittently depressing the brake pedal which actuates the inching valve which in turn deactivates the clutch mechanism thereby terminating driving torque to the vehicle transmission. When the vehicle is operated upon ground having a downward slope, the limiting means inactivates the inching valve whereupon depression of the brake pedal does not actuate the inching valve so as to deactuate the clutch mechanism. Consequently, the vehicle is not effectively placed in a neutral condition and the vehicle does not operate in an uncontrolled manner and the inching operation may be performed by the braking means.

9 Claims, 2 Drawing Figures 3,957,145

CLUTCH CONTROLLING APPARATUS

BACKGROUND OF THE INVENTION

1. Field of the Invention

This invention relates generally to control apparatus and more particularly to clutch controlling apparatus which is used upon motor vehicles, especially industrial vehicles.

2. Description of the Prior Art

In general, industrial vehicles such as for example, a forklift vehicle equipped with an automatic transmission having a torque converter are often operated under full-load conditions of the engine in order to perform cargo-lifting operations, and furthermore, such operations often require forward and backward inching-type movements of the vehicle. In order to easily attain such movements, it is conventional to equip the vehicle's transmission with an inching valve which is actuated correspondingly with the brake pedal of the vehicle so as to maintain the clutch of the transmission in a semi-clutched condition.

In most of such conventional structures, the inching valve control for maintaining the clutch of the transmission in the semi-clutched condition is actuated upon an idle stroke of the brake pedal while the brake of the vehicle is actuated by the remaining stroke of the pedal. Hence, problems are not usually encountered when employing the vehicle upon level land, although it is sometimes quite dangerous to employ the vehicle upon land which slopes downwardly. For example, when performing a lifting operation upon land which has a downward slope, if the brake of the vehicle is actuated and inactuated so as to provide inching movement of the vehicle when lifting the vehicle's transmission has its clutch repeatedly actuated and inactuated so that at particular instances the vehicle is permitted to move under the influence of gravity an undetermined distance in an uncontrolled fashion whereby it may possibly collide with some obstacle or person.

In order to obviate these problems, it has been proposed to employ structure which includes two brake pedals, one of which actuates the brake of the vehicle and the other of which actuates both the brake of the vehicle and the inching valve by an interlocking mechanism. It has also been proposed to employ structure having a brake-holder for maintaining the brake fluid pressure within the brake fluid system when the brake pedal is depressed. However, the former structure requires two types of brake systems, such as for example, a brake pedal or a brake master cylinder, so that a driver is obliged to selectively depress the brake pedals depending upon the conditions present, such action of course being quite troublesome. Similarly, the latter structure requires means whereby fluid pressure to the piston-cups of the brake system is always maintained so that the possibility of having an accident is increased, and furthermore, the system will be more costly because of the additional brake-holder assembly.

SUMMARY OF THE INVENTION

Accordingly, it is an object of the present invention to provide an improved clutch controlling apparatus which may be used in industrial-type vehicles, such as, for example, forklift trucks.

Another object of the present invention is to provide an improved clutch controlling apparatus which may be used in industrial-type vehicles so as to safely control the operation of such vehicles during the performance of inching operations independent of the slope of the ground upon which the operations are being conducted.

Still another object of the present invention is to provide an improved clutch controlling apparatus which may be used in industrial-type vehicles and which does not undesirably deactivate the clutch mechanisms when the braking means is actuated.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
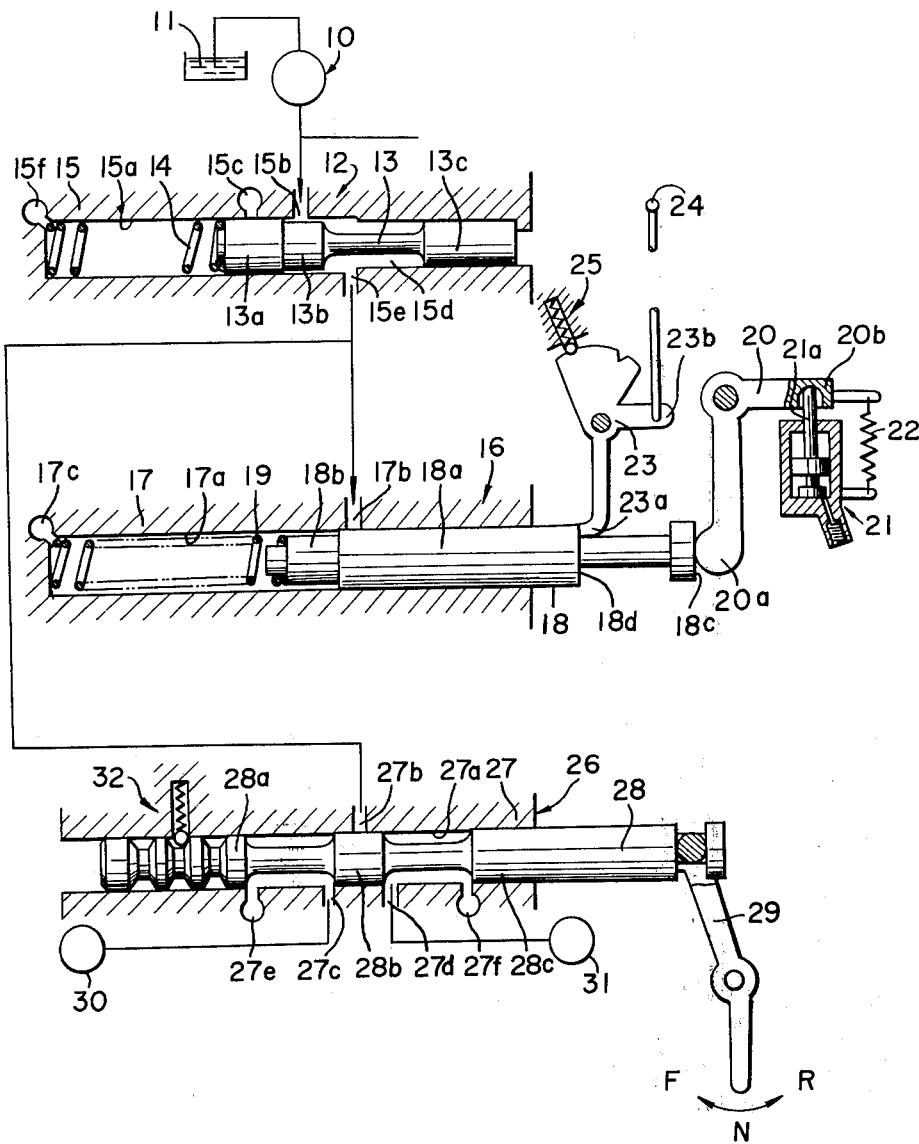
FIG. 1 is a schematic partially sectional view of one embodiment of a clutch controlling apparatus constructed according to this invention.

Referring now to the drawings, and more particularly to FIG. 1 thereof, a fluid pump 10 is actuated by an engine, not shown, so as to deliver oil from an oil reservoir tank 11 to a regulator valve, generally indicated by the reference character 12. The regulator valve 12 comprises a valve 13 and a coil spring 14 which biases the valve 13 toward the right as seen in FIG. 1, both the valve 13 and the spring 14 being disposed within an axial bore 15a formed within a valve body 15 of the regulator valve 12. The valve 13 includes a cylindrical section 13a whose diameter is slightly less than that of bore 15a, a cylindrical section 13b of a slightly smaller diameter which is integrally joined to the large diameter section 13a, and a cylindrical section 13c having a diameter which is also smaller than that of the section 13a and which is separated from the section 13b by means of an axial cylindrical section of still smaller diameter.

Within the valve body 15, radially extending ports 15b, 15c and 15e, as well as port 15f are formed so as to be fluidically connected with the valve bore 15a. The port 15b is connected to the output of the fluid pump 10 while the port 15e is connected to an inching valve, generally indicated by the reference character 16, and a manually operated valve, generally indicated by the reference character 26. The ports 15c and 15f are the discharge openings to the oil tank 11. The port 15b is always connected to the port 15e through an annular fluid pressure chamber 15d defined between the cylindrical section 13b and the small cylindrical section 13c of the valve 13. The inching valve 16 includes a valve 18 and a coil spring 19 which biases the valve 18 toward the right as seen in FIG. 1, the valve 18 having a cylindrical section 18a which is slidably disposed, in sealing relationship, within a valve bore 17a formed within an inching valve body 17, and a cylindrical section 18b of a diameter smaller than that of section 18a, the sections 18a and 18b being integrally joined together.

Within the inching valve body 17, there are found ports 17b and 17c which are fluidically connected to the valve bore 17a, the port 17b always being connected to the port 15e of the regulator valve 12, and in the normal condition, the port 17b is closed by means of the large diameter section 18a of the valve 18. The port 17c is a discharge opening to the oil tank 11. At the right end portion of the valve 18, there is provided a stem member having a first flange portion 18c which contacts one side of an arm 20a of an L-shaped lever 20 which is pivoted to the vehicle body, not shown. Another arm 20b of L-shaped lever 20 is contacted to an end portion of a piston 21a, disposed within a fluid pressure cylinder 21 mounted to the vehicle body, which is moved in the upward direction as seen in FIG. 1 by means of a damping fluid pressure provided by the master cylinder in the brake system.

A spring 22 is tensioned between an extended portion of arm 20b and an arm mounted to the fluid pressure cylinder 21 so as to actuate the L-shaped lever 20, whereby contact between the arm 20a and the flange 18c is positively made and the port 17b is closed by means of the large diameter section 18a of the valve 18 which compresses the spring 19. The spring 22 is a return spring for the piston 21a which has the function of a stopper for preventing further clockwise rotation of the L-shaped lever 20, under the influence of the spring 22, passed the position shown in FIG. 1.

A second flange portion 18d is formed upon the right edge surface of the large diameter section 18a, a first arm 23a, of a limiting means 23 which is pivoted to the vehicle body, contacting the second flange portion 18d. A manually operated rod and knob assembly 24, provided within an operator's cab, is connected to a second arm 23b of the limiting means 23 so as to pivotably rotate the limiting means. A detent means 25, mounted to the vehicle body, is also provided relative to another portion of the limiting means 23 for determining two positions of means 23 relative to valve 18, one position retaining the valve 18 at the position shown in FIG. 1 by means of assembly 24 acting upon arm 23b which in turn causes arm 23a to abut flange portion 18d as shown in the drawing, and another position which permits the release of the first arm 23a from abutting the second flange 18d by moving the assembly 24 in an upward direction as seen in FIG. 1 which rotates arms 23b and 23a in a counterclockwise direction.

The conventional manually operated valve 26 similarly includes an axial valve bore 27a formed within a valve body 27 having radial ports 27b, 27c, 27d, 27e and 27f fluidically connected to the bore, and a valve 28 which is slidably disposed, in sealing relationship, within the valve bore 27a. The valve 28 has cylindrical portions 28a, 28b, and 28c all of which have the same diametrical dimension. The port 27b is connected through an oil passage to the port 15e of the regulator valve 12 while the port 27c is connected to a servo mechanism of a clutch mechanism 30 for commencing a forward movement of the vehicle, not shown. Similarly, the port 27d is connected to a clutch mechanism 31 for commencing a backward movement of the vehicle, while the ports 27e and 27f are discharge openings to the oil tank 11. A shift lever 29 provided within the operator's cab is desirably connected to the right end of the valve 28, as seen in FIG. 1, a detent means, generally indicated by the reference character 32, for positioning the valve 28 at a neutral position, a forward movement position, or a backward movement position, being formed at the left end of the valve 28.

In operation, the oil pressure supplied from the pump 10 to the regulator valve 12 in introduced into the chamber 15d so as to provide the hydraulic pressure to the differential area existing between the large cylindrical section 13a and the small cylindrical section 13c whereby the oil pressure within the chamber 15d is regulated so as to be substantially constant by means of controlling the opening and closing of the outlet 15c by moving the valve 13 toward the left against the biasing action of the spring 14.

The oil pressure thus regulated to a substantially constant pressure by means of the regulator valve 12, is then supplied from the port 15e to the port 17b of the inching valve 16 and the port 27b of the manually operated valve 26. However, since the port 17b is closed by means of the large cylindrical section 18a, the oil pressure supplied to such port is not supplied to the valve bore 17a, the valve 18 being held in the position shown in FIG. 1 by means of the spring 22 and the L-shaped lever 20 due to the fact that the brake pedal has not been depressed and therefore a damping fluid pressure is not provided to the fluid pressure cylinder 21. Similarly, since the port 27b of the manually operated valve 26 is also closed by means of the cylindrical section 28b of the valve 28 when the valve 28 is in the neutral position, the oil pressure is not supplied to either of the clutch mechanisms for commencing a forward movement or a backward movement, and consequently, the transmission is not actuated so as to transmit driving power and the vehicle is therefore maintained in the stopped position.

When, however, the shift lever 29 is shifted to the F or forward position, the valve 28 is shifted toward the right as seen in FIG. 1 whereby the port 27b is now fluidically connected to the port 27c by means of the annular chamber defined between the sections 28a and 28b, while the outlet 27e is closed by means of the cylindrical section 28a. Accordingly, the fluid pressure, hereinafter referred to as the line pressure, regulated by the regulator valve 12 is now supplied to the clutch 30 for commencing a forward movement whereby the vehicle is advanced.

When the shift lever 29 is set to the R or reverse position, the valve 28 is shifted toward the left whereby the port 27b is now connected to the port 27d and the outlet port 27f is closed by means of section 28c so as to transmit the line pressure to the clutch 31 for commencing a backward or reverse movement of the vehicle.

Thus, if while the transmission is in the forward or backward position and the assembly 24 is also in its upper position, the brake pedal is depressed the damping fluid pressure is transmitted to the fluid pressure cylinder 21 whereby the piston 21a is raised against the biasing force of the spring 22 and the L-shaped lever 20 is consequently rotated in a counterclockwise direction around the pivot point. The valve 18, under the biasing action of the spring 19 and due to the release therefrom of the L-shaped lever 20, is then shifted toward the right as seen in FIG. 1. The shift rate is dependent upon the damping fluid pressure corresponding to the degree of depression of the brake pedal and the balance between the tension of the spring 22 and the spring 19, and accordingly, the shift rate of the valve 18 can be selectively controlled by the degree of depression of the brake pedal.

When the large cylindrical section 18a of the valve 18 is moved so as to fluidically connect the port 17b with the valve bore 17a, the fluid pressure within chamber 15d of the regulator valve 12 may be supplied to the port 17b so as to be transmitted to the annular chamber surrounding section 18b and is then exhausted through the valve bore 17a and the outlet 17c so as to become low pressure. Accordingly, the valve 13 of the regulator valve 12 is returned by the force of spring 14 to the position shown in FIG. 1 and an annular chamber is formed about the section 13b so as to fluidically connect port 15b and the chamber 15d. The fluid pressure within the chamber 15d, that is, the fluid pressure for actuating the clutch 30 for a forward movement or the clutch 31 for a backward movement, is thus regulated to a pressure which is lower than the line pressure due to the relation between the chamber about section 13b and the chamber about section 18b, whereby the force acting upon the clutch 30 or 31 is altered so that the transmission is moved from a semi-clutched condition to a declutched condition and the inching operation of the vehicle can be achieved only by operation of the brake pedal.

The inching operation can of course be achieved by depressing the brake pedal. However, even when the brake pedal is depressed for decreasing the speed of the vehicle, such as for example, when the vehicle is upon land having a downward slope, the inching valve 16 nevertheless imparts the inching operation to the vehicle such that, before the complete actuation of the brake, the vehicle, under the influence of gravity, may move in an uncontrolled fashion, whereby the vehicle may accidentally collide with an obstacle or person.

Accordingly, when the vehicle is upon land having a downward slope, the assembly 24 is moved so as to shift the limiting means 23 to the position shown in FIG. 1, whereby the first arm 23a of the limiting means abuts the second flange 18d of the valve 18 whereby the valve 18 is restrained in the position shown in FIG. 1. Hence, even when the brake pedal is depressed so as to shift the arm 20a of the L-shaped lever 20 toward the right as seen in FIG. 1, while the contact between the arm 20a and the first flange 18c aof the valve 18 is broken, the valve 18 is nevertheless retained in its position as shown in FIG. 1, whereby the inching function of the inching valve 16 is inactivated. In this manner, when the brake pedal is depressed the line pressure is transmitted to the clutch 30 for forward movement or the clutch 31 for backward movement, whereby a driving torque is continuously transmitted to the transmission and the vehicle does not operate in an uncontrolled fashion.

Figure 2:
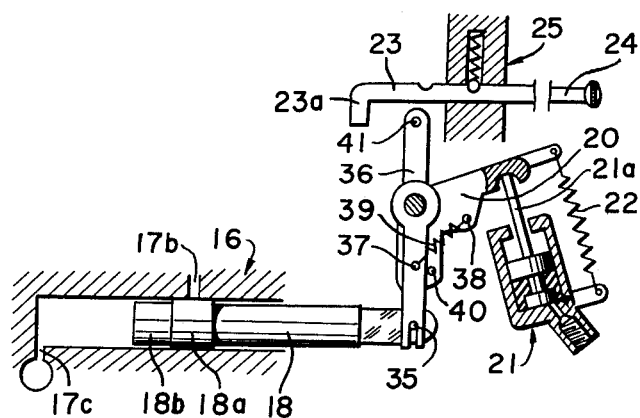
FIG. 2 is a schematic partially sectional view of another embodiment of a clutch controlling apparatus constructed according to this invention.

Referring now to FIG. 2, a second embodiment of the inching valve assembly of the present invention will now be described. A pin 35 is provided upon the right end of the valve 18 of the inching valve 16. A lever 36 having a longitudinal slot which surroundingly engages pin 35, is pivotally mounted at the middle portion thereof to the vehicle body and the L-shaped lever 20 is coaxially mounted therewith. A spring 39 is tensioned between a pin 37, which is secured to lever 36 between pin 35 and the pivot point of lever 36, and a pin 38 which is secured to the L-shaped lever 20 so as to bias the lever 36 and the lever 20 relative to one another.

Another pin 40 is also secured to the L-shaped lever 20 so as to serve as a stopper for limiting the rotation of the lever 36 relative to the L-shaped lever 20 under the influence of the spring 39 and also as a means for transmitting the rotating force of the lever 36 to the L-shaped lever 20 so as to rotate lever 20 in a counterclockwise direction from the position shown in FIG. 2. Still another pin 41 is provided upon the upper end of the lever 36 so as to contact the hook-shaped part 23a of the limiting means 23 when the limiting means 23, which is slidably mounted upon the vehicle body and is selectively set with respect thereto by the detent 25, is moved by means of the knob assembly 24 which is located near the driver's seat.

The operation of this embodiment will now be described. When the structure is in the condition shown in FIG. 2, the inching function may be performed. Accordingly, when the brake pedal is depressed, the damping fluid pressure within the fluid pressure cylinder 21 is increased so that the L-shaped lever 20 is rotated in a counterclockwise direction against the tension of the spring 22. The counterclockwise rotating force of the L-shaped lever 20 is transmitted to the lever 36 by means of the spring 39 so as to also rotate the same in a counterclockwise direction whereby the valve 18 of the inching valve 16 is shifted toward the right through means of the actuating pin 35. The shift rate corresponds to the rate of increase in the damping fluid pressure within cylinder 21. Furthermore, as a result of the shift of the valve 18, port 17b is opened to the valve bore by means of an annular chamber formed between the bore and valve portion 18b, the annular chamber communicating with port 17c, whereupon the inching operation may be performed.

When the inching function is not required, the knob assembly 24 is pulled toward the right as seen in FIG. 2, whereby the limiting means 23 is shifted toward the right and the hook-shaped part 23a is held by means of the detent 25 at a position so as to contact the pin 41 of lever 36. Consequently, when the brake pedal is depressed under such conditions the fluid pressure within the fluid pressure cylinder 21 causes the rotation, in a counterclockwise direction, of the L-shaped lever 20 through actuation of the piston 21a against the force of spring 22. The torque is transmitted by the spring 39 to the lever 36. However, the lever 36 is prevented from rotating in a counterclockwise direction by the limiting means 23 and portion 23a, whereby the movement of the L-shaped lever 20 merely causes the spring 39 to be tensioned, while the valve 18 is not shifted and in fact remains in the position shown in FIG. 2. Accordingly, the function of the inching valve 16 is inactuated. When the knob assembly 24 is returned to the position shown in FIG. 2, the function of the inching valve may again be attained.

Thus it may be seen that in accordance with this invention, the function of the inching valve can be inactuated by simply moving a manually operated means located within the driver's cab which in turn actuates a simple limiting means for preventing the actuation of the inching function of the inching valve, the above being accomplished without providing two types of brake systems, such as for example, a brake pedal or a brake master cylinder, or without providing for a brake holder having complicated structure within the brake oil system, and whereby only the brake system is actuated without disconnecting the clutch for transmitting the driving force to the vehicle. The operation is thus accurate, simple, and economical, and the device of this invention is quite effective and advantageous.

Obviously, many changes and modifications of the present invention are possible in light of the above teachings. It is to be understood therefore, that within the scope of the appended claims, the invention may be practiced otherwise than as specifically described herein.

What is claimed as new and desired to be secured by letters patent of the United States is:

1. A clutch controlling apparatus comprising:
   a fluid pressure source for providing a substantially constant fluid pressure;
   a fluid pressure type clutch, for transmitting a driving force of the engine to an output axis, actuated by said fluid pressure of said fluid pressure source;
   an inching vlave means for controlling the degree to which said fluid pressure type clutch is actuated which is dependent upon the degree to which a brake pedal is depressed, said inching valve means being disposed within a fluid passage between said fluid pressure source and said fluid pressure type clutch; and
   limiting means for mechanically inactivating said inching valve means being directly contacted with said inching valve means to prevent movement of said inching valve means so as to maintain said inching valve means in an inoperative state independent of the actuation and deactuation of said brake pedal, said limiting means being positioned to its limiting position by manually operated means provided near the vehicle operator's seat.

2. A clutch controlling apparatus as set forth in claim 1, wherein said fluid pressure source comprises a fluid pump actuated by an engine so as to deliver fluid from a fluid tank and to supply said fluid to a regulator valve associated with said fluid pressure type clutch.

3. A clutch controlling apparatus comprising:
   a fluid pressure source for providing a substantially constant fluid pressure;
   a fluid pressure type clutch, for transmitting a driving force of the engine to an output axis, actuated by said fluid pressure of said fluid pressure source;
   an inching valve means for controlling the degree to which said fluid pressure type clutch is actuated which is dependent upon the degree to which a brake pedal is depressed, said inching valve means being disposed within a fluid passage between said fluid pressure source and said fluid pressure type clutch;
   limiting means for inactivating said inching valve means so as to maintain said inching valve means in an inoperative state independent of the actuation and deactuation of said brake pedal, said limiting means being positioned by manually operated means provided near the vehicle operator's seat; and
   a regulator valve means for providing a substantially constant fluid pressure to said inching valve means having a first cylindrical section, a second cylindrical section of slightly smaller diameter than said first section and which is joined to said first section, and a third cylindrical section of slightly smaller diameter than said first section and separated from said second section by means of a fourth cylindrical section.

4. A clutch controlling apparatus comprising:
   a fluid pressure source for providing a substantially constant fluid pressure;
   a fluid pressure type clutch, for transmitting a driving force of the engine to an output axis, actuated by said fluid pressure of said fluid pressure source;
   an inching valve means for controlling the degree to which said fluid pressure type clutch is actuated which is dependent upon the degree to which a brake pedal is depressed, said inching valve means being disposed within a fluid passage between said fluid pressure source and said fluid pressure type clutch and comprising a valve having a first cylindrical section which is slidably disposed in sealing relationship within a valve bore of an inching valve body and a second cylindrical section of a smaller diameter than said first section and joined to said first section, an edge of said valve adapted for contacting a lever which is connected to a piston disposed within a fluid pressure cylinder, said piston being actuated by a damping fluid pressure provided from a master cylinder within the vehicle brake system; and
   limiting means for inactivating said inching valve means so as to maintain said inching valve means manually an inoperative state independent of the actuation and deactuation of said brake pedal, said limiting means being positioned by manually operated means provided near the vehicle operator's seat.

5. A clutch controlling apparatus comprising:
   a fluid pressure source for providing a substantially constant fluid pressure;
   a fluid pressure type clutch, for transmitting a driving force of the engine to an output axis, actuated by said fluid pressure of said fluid pressure source;
   an inching valve means for controlling the degree to which said fluid pressure type clutch is actuated which is dependent upon the degree to which a brake pedal is depressed, said inching valve means being disposed within a fluid passage between said fluid pressure source and said fluid pressure type clutch; and
   limiting means for inactivating said inching valve means so as to maintain said inching valve means in an inoperative state independent of the actuation and deactuation of said brake pedal, said limiting means being positioned by manually operated means provided near the vehicle operator's seat, wherein said limiting means further includes detent means for positioning said limiting means within two positions relative to said inching valve means, whereby when said limiting means occupies one of said two positions said inching means is permitted to operate, while when said limiting means occupies said other of said two positions said inching valve means is maintained in an inoperative position.

6. A clutch controlling apparatus comprising:
   a fluid pressure source for providing a substantially constant fluid pressure;
   a fluid pressure type clutch, for transmitting a driving force of the engine to an output axis, actuated by said fluid pressure of said fluid pressure source;
   an inching valve means for controlling the degree to which said fluid pressure type clutch is actuated which is dependent upon the degree to which a brake pedal is depressed, said inching valve means being disposed within a fluid passage between said fluid pressure source and said fluid pressure type clutch; and
   limiting means for inactivating said inching valve means so as to maintain said inching valve means in an inoperative state independent of the actuation and deactuation of said brake pedal, said limiting means being positioned by manually operated means provided near the vehicle operator's seat, wherein said inching valve means is connected to a lever associated with said limiting means which able to be maintained in a fixed position by said manually operated means.

7. A clutch controlling apparatus having a clutch fluid pressure control circuit which comprises:
   a fluid pressure source;
   a fluid pressure type clutch;
   a passage fluidically connecting said fluid pressure source to said clutch;
   an inching valve which is connected to said passage and which controls the pressure transmitted to said clutch which is dependent upon the degree of depression of a brake pedal;
   a spring which continuously biases said inching valve which has a variable orifice disposed between an inlet and an outlet of said passage within said passage in a direction which tends to increase the orifice; and
   a regulator valve,
   wherein said orifice is increased so as to decrease said fluid pressure provided from said fluid pressure source to said clutch when said inching valve is permitted to operate by means of depressing said brake, whereas said fluid pressure supplied from said fluid pressure source is exhausted from a drain port so as to maintain a predetermined pressure when said brake is not actuated.

8. A clutch controlling apparatus as set forth in claim 1, wherein said limiting means maintains said inching valve means in said inoperative state independent of the actuation or deactuation of any fluid pressure operating means operatively associated with said fluid pressure source.

9. A clutch controlling apparatus comprising:
   a fluid pressure source for providing a substantially constant fluid pressure;
   a fluid pressure type clutch, for transmitting a driving force of an engine to an output axis, actuated by said fluid pressure of said fluid pressure source;
   an inching valve means for controlling the degree to which said fluid pressure type clutch is actuated, including a movable member biased in a given direction, which is dependent upon the degree to which a brake pedal is depressed, said inching valve means being disposed within a fluid passage between said fluid pressure source and said fluid pressure type clutch;
   limiting means directly contacted with said inching valve means for mechanically inactivating said inching valve means and being selectively operable manually in a first position to contact and limit the movement of said movable member in said given direction so as to maintain said inching valve means in an inoperative state independent of the actuation and deactuation of said brake pedal, and in a second position to free said movable member for movement in said given direction; and
   means arranged between said brake pedal and said movable member for controlling the degree of movement of said movable member in said given direction according to the degree to which said brake pedal is depressed, when said inching valve means is placed in an operative state by manually moving said limiting means to said second position.

* * * * *